US011351980B2

(12) United States Patent
Books et al.

(10) Patent No.: US 11,351,980 B2
(45) Date of Patent: Jun. 7, 2022

(54) SYSTEMS AND METHODS FOR MANAGING ENGINE STOP-START

(71) Applicant: Cummins Inc., Columbus, IN (US)

(72) Inventors: Martin T. Books, Columbus, IN (US); Praveen Chitradurga Muralidhar, Ann Arbor, MI (US)

(73) Assignee: Cummins Inc., Columbus, IN (US)

(*) Notice: Subject to any disclaimer, the term of this patent is extended or adjusted under 35 U.S.C. 154(b) by 342 days.

(21) Appl. No.: 16/627,104

(22) PCT Filed: Jul. 5, 2018

(86) PCT No.: PCT/US2018/040856
§ 371 (c)(1),
(2) Date: Dec. 27, 2019

(87) PCT Pub. No.: WO2019/010262
PCT Pub. Date: Jan. 10, 2019

(65) Prior Publication Data
US 2020/0164859 A1    May 28, 2020

Related U.S. Application Data

(60) Provisional application No. 62/529,247, filed on Jul. 6, 2017.

(51) Int. Cl.
*B60W 20/12* (2016.01)
*B60W 10/06* (2006.01)
*B60W 10/08* (2006.01)
*B60W 30/18* (2012.01)
(Continued)

(52) U.S. Cl.
CPC ............ *B60W 20/12* (2016.01); *B60W 10/06* (2013.01); *B60W 10/08* (2013.01); *B60W 30/18* (2013.01);
(Continued)

(58) Field of Classification Search
CPC ..... B60K 6/26; B60W 20/12; B60W 2710/06; B60W 10/08; B60W 30/18;
(Continued)

(56) References Cited

U.S. PATENT DOCUMENTS 8,538,694 B2    9/2013   Conway
8,577,528 B2    11/2013  Uyeki
(Continued)

FOREIGN PATENT DOCUMENTS

WO    WO-2012/058022    5/2012

OTHER PUBLICATIONS

International Search Report and Written Opinion for International Application No. PCT/US2018/040856, dated Sep. 28, 2018, 10 pages.

*Primary Examiner* — Tyler J Lee
*Assistant Examiner* — Yufeng Zhang
(74) *Attorney, Agent, or Firm* — Foley & Lardner LLP

(57) ABSTRACT

An apparatus includes a route circuit and a stop-start circuit. The route circuit is structured to estimate a number of charging locations for an energy storage system of a vehicle for a planned route. The stop-start circuit is structured to determine a stop-start strategy for an engine of the vehicle based on the estimated number of charging locations and expected charges to be received by the energy storage system. The stop-start strategy defines a frequency and duration of using the engine in an on-mode during operation of the vehicle along the planned route. The stop-start circuit is further structured to determine that the energy storage system fails to receive an expected charge at one of the charging locations, and update the stop-start strategy to compensate for failing to receive the expected charge by increasing use of the engine in the on-mode during operation of the vehicle along the planned route.

20 Claims, 4 Drawing Sheets

(51) Int. Cl.
*F02N 11/08* (2006.01)
*G01C 21/34* (2006.01)
*B60K 6/26* (2007.10)

(52) U.S. Cl.
CPC ...... *F02N 11/0833* (2013.01); *G01C 21/3476* (2013.01); *B60K 6/26* (2013.01); *B60W 2556/50* (2020.02); *B60W 2710/06* (2013.01); *B60Y 2200/92* (2013.01); *F02N 2200/08* (2013.01); *F02N 2200/123* (2013.01)

(58) Field of Classification Search
CPC .. B60W 2556/50; B60W 10/06; B60W 20/20; B60W 50/0097; B60Y 2200/92; F02N 11/0833; F02N 2200/08; F02N 2200/123; F02N 11/0818; Y02T 10/40; Y02T 10/62
See application file for complete search history.

(56) References Cited

U.S. PATENT DOCUMENTS

| | | | |
|---|---|---|---|
| 8,880,337 B2 * | 11/2014 | Scholl | G01C 21/3682 |
| | | | 701/426 |
| 9,171,268 B1 | 10/2015 | Penilla et al. | |
| 2010/0094496 A1 | 4/2010 | Hershkovitz et al. | |
| 2011/0288765 A1 | 11/2011 | Conway | |
| 2013/0345976 A1 | 12/2013 | Li et al. | |
| 2014/0257608 A1 | 9/2014 | Dufford | |
| 2014/0379183 A1 | 12/2014 | Long | |
| 2015/0045985 A1 | 2/2015 | Yenamandra et al. | |
| 2015/0226567 A1 * | 8/2015 | North | G01C 21/367 |
| | | | 701/533 |
| 2017/0050631 A1 | 2/2017 | Muralidhar et al. | |

\* cited by examiner

SYSTEMS AND METHODS FOR MANAGING ENGINE STOP-START

CROSS-REFERENCE TO RELATED PATENT APPLICATIONS

This application claims the benefit of U.S. Provisional Application No. 62/529,247, filed Jul. 6, 2017, which is incorporated herein by reference in its entirety.

TECHNICAL FIELD

The present application relates generally to the field of engine stop-start. More particularly, the present application relates to systems and methods for managing engine stop-start in various applications, such as with plug-in hybrid vehicles, electric vehicles, and the like.

BACKGROUND

Hybrid drivetrains can propel a vehicle using an electric motor and an internal combustion engine. The electric motor can mechanically couple to the drivetrain to directly provide power thereto. The internal combustion engine can mechanically couple to the drivetrain to directly provide power thereto or to provide energy to a generator to generate electrical energy for use by the motor. Hybrid vehicles may employ stop-start strategies that selectively turn the engine on and off based on various demands of the vehicle.

SUMMARY

One embodiment relates to an apparatus. The apparatus includes a route circuit and a stop-start circuit. The route circuit is structured to estimate a number of charging locations for an energy storage system of a vehicle positioned along a planned route of the vehicle. The energy storage system is structured to power an electromechanical device for driving the vehicle. The stop-start circuit is structured to determine a stop-start strategy for an engine of the vehicle based on the estimated number of charging locations and expected charges to be received by the energy storage system. The stop-start strategy defines a frequency and a duration of using the engine in an on-mode during operation of the vehicle along the planned route. The stop-start circuit is further structured to determine that the energy storage system fails to receive an expected charge at one of the charging locations, and update the stop-start strategy to compensate for failing to receive the expected charge by increasing use of the engine in the on-mode during operation of the vehicle along the planned route.

Another embodiment relates to a method. The method includes estimating, by a processing circuit, a number of charging locations for an energy storage system of a vehicle positioned along a planned route of the vehicle. The energy storage system is structured to power an electromechanical device for driving the vehicle. The method further includes determining, by the processing circuit, a stop-start strategy for an engine of the vehicle based on the estimated number of charging locations and expected charges to be received by the energy storage system. The stop-start strategy defines a frequency and a duration of using the engine in an on-mode during operation of the vehicle along the planned route. In the on-mode, the engine at least one of (i) charges the energy storage system, (ii) directly powers the electromechanical device, and (iii) at least partially drives the vehicle. The method further includes determining, by the processing circuit, that the energy storage system fails to receive an expected charge at one of the charging locations; and updating, by the processing circuit, the stop-start strategy in response to determining that the expected charge was not received by increasing use of the engine in the on-mode during operation of the vehicle along the planned route.

Another embodiment relates to a system. The system includes a controller communicably and operatively coupled to an engine and an energy storage system of a vehicle. The controller is structured to estimate a number of charging locations for the energy storage system along a planned route of the vehicle, determine a stop-start strategy for the engine based on the estimated number of charging locations and expected charges to be received by the energy storage system, determine that the energy storage system fails to receive an expected charge at one of the charging locations, and update the stop-start strategy to compensate for failing to receive the expected charge by increasing use of the engine in an on-mode during operation of the vehicle along the planned route. The stop-start strategy defines a frequency and a duration of using the engine in the on-mode during operation of the vehicle along the planned route.

These and other features, together with the organization and manner of operation thereof, will become apparent from the following detailed description when taken in conjunction with the accompanying drawings.

DETAILED DESCRIPTION

Figure 1:
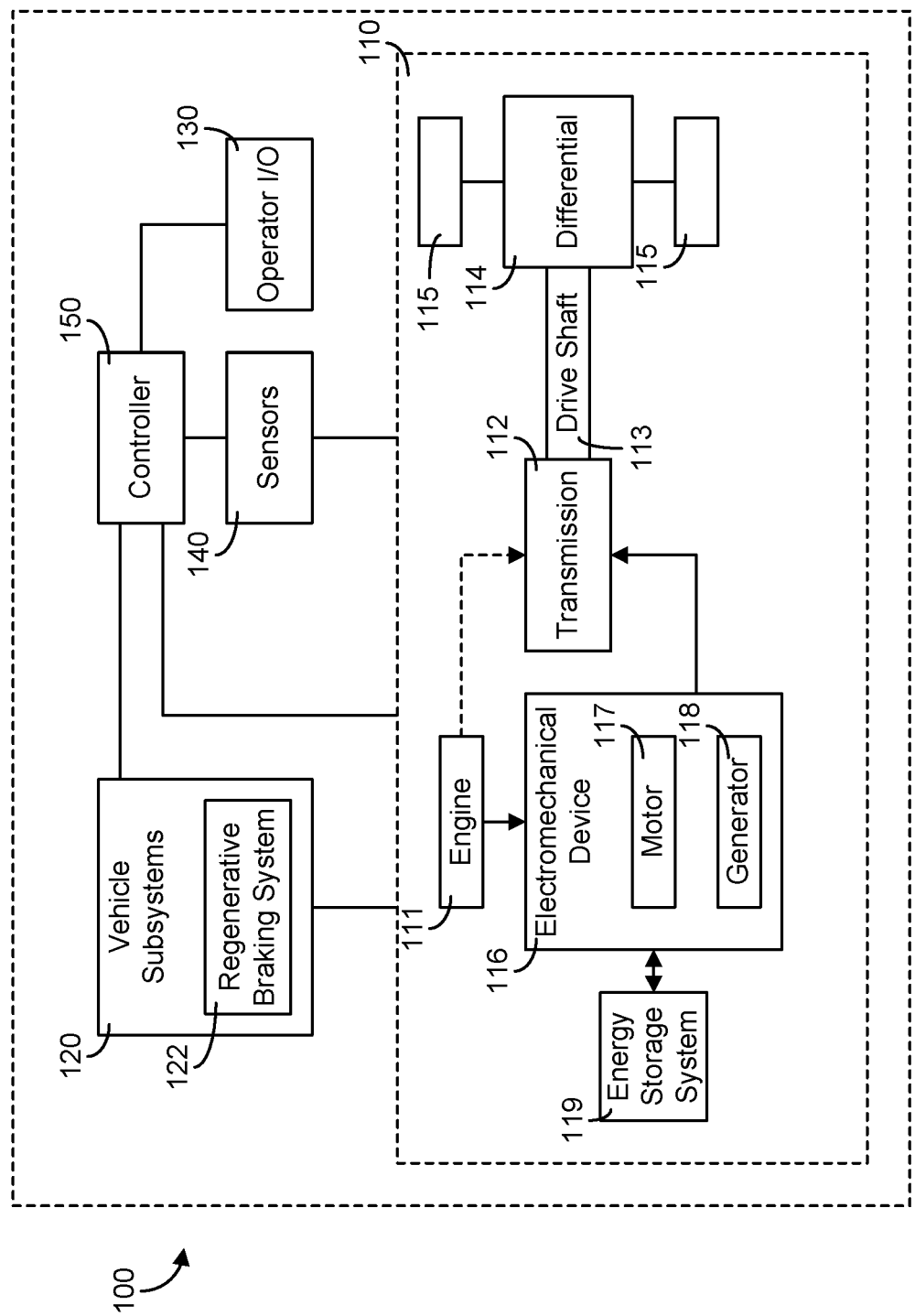
FIG. 1 is a schematic diagram of a vehicle with a controller, according to an example embodiment.

Following below are more detailed descriptions of various concepts related to, and implementations of, methods, apparatuses, and systems for managing engine stop-start. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for managing engine stop-start in hybrid electric vehicles where boost charging stations may be frequently available in a driving route, and using the interval between charging stations or boost charging events as a trigger for starting the engine (e.g., using the engine to compensate for longer than normal times between boost charges, missed charges, etc.). In hybrid vehicles architectures, such as Plug-in Hybrid Vehicles (PHEV), Range Extended Electric Vehicles (REEV), Series Hybrid Vehicles (SHV), etc., multiple independent sources of energy are available to propel the vehicle. Energy sources may include internal combustion engines and motors and/or generators powered by energy storage systems (e.g., high voltage battery, super capacitors, etc.). In such hybrid vehicle architectures, vehicle propulsion may be achieved by using stored electric energy of the energy storage system and/or by the engine (e.g., if the engine is mechanically coupled to the driveline, etc.). The engine may work with the generator to provide propulsion power to the electric drive, or may work with a generator to replenish the energy storage system.

Depending on the drive cycle and battery size, the engine may be shut off and remain off for significant portions of the drive cycle. For example, in some cases, the engine may not be powered on at all during a drive cycle. If the drive cycle does not provide adequate opportunities to replenish the energy storage through regenerative braking or the occasional charging station, the engine may be restarted to replenish the energy storage more frequently. However, constantly starting and stopping the engine may cause undesirable vehicle noise, vibration, and harshness (NVH), engine hardware durability concerns, etc. Other considerations include municipal ordinances which may limit or constrain engine running. Also, daily variability in drive cycles may result in some days where the stored battery charge is sufficient to complete the whole day, and starting the engine prematurely is considered wasteful. The varying number of times the engine may be started and the varying duration of total engine run time on a given day, combined with the efficiency consequences of engine warm-up in cold environments may produce sub-optimal fuel economy if not managed properly. The systems, methods, and apparatuses of the present disclosure address these issues, while not affecting the ability of the powertrain to meet driver demand.

Akin to gas stations, battery quick charging stations may be part of a vehicle's environmental infrastructure (e.g., an electric transit bus may have access to quick boost charging stations at a plurality of bus stops on its route, a delivery vehicle may have charging stations available to it at a central depot or pickup or delivery location, etc.). According to an example embodiment, if battery charging stations are available on a route of the vehicle, engine stop-start decisions may be tied to their frequency of occurrence. Using a global positioning system (GPS), an intelligent transportation system (ITS), near or far field communication protocols (e.g., radio, cellular, Bluetooth, etc.), and/or preprogrammed route information, the systems, methods, and apparatuses of the present disclosure may be structured to run the engine only during the portions of the drive cycle when there are no or fewer opportunities to externally charge the energy storage system. For example, charging stations may be expected at least once per hour in a drive cycle. If that does not occur (e.g., a charging station is out of order, already occupied, or the vehicle misses the charging station, etc.), the engine may be operated to provide the expected energy boost that the vehicle would have otherwise received from the charging station. If adequate charging stations are encountered, then the engine may remain in an off state. In some embodiments, the engine is brought online to provide supplemental electric power (e.g., via operating the generator, etc.) during high loading conditions on the motor (e.g., when the vehicle encounters a steep incline, etc.).

The systems, methods, and apparatuses of the present disclosure may determine the charging station frequency in various ways. By way of example, the charging station frequency may be a fixed number for a fleet (e.g., charging stations exist only at "depot" hubs that all vehicles encounter regularly, charging stations along a bus route, etc.). By way of another example, the charging station frequency may be route dependent, which may be inputted to a controller (e.g., a delivery route of a vehicle, etc.). By way of yet another example, the charging frequency may be unknown. In such a situation, a controller may detect charging opportunities as the vehicle is driving and recognize whether the opportunity was utilized or not. In each of these cases, engine usage choices may be modified based on whether charging opportunities are expected in the near future, and whether actual charging events resulted from such charging opportunities.

Referring now to FIG. 1, a schematic diagram of a vehicle 100 with a controller 150 is shown according to an example embodiment. As shown in FIG. 1, the vehicle 100 generally includes a powertrain system 110, vehicle subsystems 120, an operator input/output (I/O) device 130, sensors 140 communicably coupled to one or more components of the vehicle 100, and a controller 150. These components are described more fully herein. The vehicle 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle which may include a stop-start feature. According to an example embodiment, the powertrain system 110 of the vehicle 100 is structured as a hybrid powertrain system. In some embodiments, the powertrain system 110 of the vehicle 100 is structured as a full electric powertrain system.

Components of the vehicle 100 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data regarding one or more of the components shown in FIG. 1. For example, the data may include operation data regarding the operating conditions of the engine 111 and/or other components (e.g., a battery system, a motor, a generator, a regenerative braking system, etc.) acquired by one or more sensors, such as sensors 140. As another example, the data may include an input from operator I/O device 130. The controller 150 may determine when it is permissible to enable the stop-start feature based on the operation data and operating parameters.

As shown in FIG. 1, the powertrain system 110 includes an engine 111, a transmission 112, a drive shaft 113, a differential 114, a final drive 115, an electromechanical device 116, and an energy storage system 119. The engine 111 may be structured as any engine type, including a spark-ignition internal combustion engine, a compression-ignition internal combustion engine, and/or a fuel cell, among other alternatives. The engine 111 may be powered by any fuel type (e.g., diesel, ethanol, gasoline, natural gas, propane, hydrogen, etc.). Similarly, the transmission 112 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission may include a variety of settings (gears, for a geared transmission) that affect different output speeds based on an input speed received thereby (e.g., from the engine 111, the electromechanical device 116, etc.). Like the engine 111 and the transmission 112, the drive shaft 113, the differential 114, and the final drive 115 may be structured in any configuration dependent on the application (e.g., the final drive 115 is structured as wheels in an automotive application and a propeller in a boat application, etc.). Further, the drive shaft 113 may be structured as any type of drive shaft including, but not limited to, a one-piece, two-piece, and a slip-in-tube driveshaft based on the application.

As shown in FIG. 1, the electromechanical device 116 include a motor 117 and a generator 118. In some embodiments, the motor 117 and the generator 118 are individual components of the electromechanical device 116. In some embodiments, the motor 117 and the generator 118 are a single device having both generating and motoring capabilities. The motor 117 may be electrically coupled to the energy storage system 119 and/or the generator 118. In some embodiments, the motor 117 is structured to receive stored electrical energy from the energy storage system 119 to facilitate operation thereof. In some embodiments, the motor 117 is structured to additionally or alternatively receive generated electrical energy from the generator 118 to facilitate operation thereof. According to an example embodiment, the motor 117 is structured to selectively and/or at least partially drive a drivetrain of the vehicle 100 (e.g., selectively couple to the transmission 112 via a clutch or other coupling device, etc.). In some embodiments, the generator 118 is structured to be mechanically coupled to and driven by the engine 111 to facilitate operation thereof. In some embodiments, the generator 118 is structured to additionally or alternatively be electrically coupled to the energy storage system 119 and/or the motor 117. According to an example embodiment, the generator 118 is structured to generate electrical energy. The electrical energy generated by the generator 118 may at least one of be (i) stored for future use within the energy storage system 119 and (ii) provided to the motor 117 to power the motor 117.

According to an example embodiment, the energy storage system 119 includes one or more batteries (e.g., high voltage batteries, a lead-acid battery, a lithium-ion battery, etc.), one or more capacitors (e.g., super capacitors, etc.), and/or any other energy storage devices. In one embodiment, the energy storage system 119 is electrically coupled to the electromechanical device 116 (e.g., the motor 117, the generator 118, etc.), the engine 111, and/or the vehicle subsystems 120 (e.g., a regenerative braking system 122, etc.). The energy storage system 119 may be structured to store electrical energy (i) received from a charging station (e.g., a vehicle charging station, etc.), (ii) generated by the generator 118, and/or (iii) generated by the regenerative braking system 122. The energy storage system 119 may be structured to provide the stored electrical energy to (i) the vehicle subsystems 120 to operate various electrical based components of the vehicle 100 (e.g., while the engine 111 is running, while the engine 111 is off, etc.), (ii) the engine 111 to start the engine 111 (e.g., in response to a restart command after the stop-start feature turns off the engine 111, when an operator keys on the engine 111, etc.), and/or to the motor 117 to operate the motor 117.

According to an example embodiment, the engine 111 is mechanically coupled to (i) the generator 118 of the electromechanical device 116 and/or (ii) the drivetrain of the vehicle 100 (e.g., the transmission 112, etc.). The engine 111 may be operable in an on-mode and an off-mode. According to an example embodiment, the on-mode of the engine 111 facilitates (i) driving the generator 118 with the engine 111 to at least one of (a) charge the energy storage system 119 and (b) directly power the motor 117, and/or (ii) selectively and at least partially driving the drivetrain of the vehicle 100 with the engine 111 (e.g., selectively coupling the engine 111 to the transmission 112 via a clutch or other coupling device, etc.).

In a traditional, non-hybrid or electric powertrain system, the engine 111 receives a chemical energy input (e.g., a fuel such as gasoline, diesel, etc.) and combusts the fuel to generate mechanical energy, in the form of a rotating crankshaft. The transmission 112 receives the rotating crankshaft and manipulates the speed of the crankshaft (e.g., the engine revolutions-per-minute (RPM), etc.) to affect a desired drive shaft speed. The rotating drive shaft 113 is received by the differential 114, which provides the rotation energy of the drive shaft 113 to the final drive 115. The final drive 115 then propels or moves the vehicle 100. In the powertrain system 110, the transmission 112 may receive an input from at least one of the motor 117 and the engine 111 (e.g., only the motor 117, only the engine 111, a combination of the engine 111 and the motor 117, etc.).

Referring still to FIG. 1, the vehicle 100 includes the vehicle subsystems 120. As shown in FIG. 1, the vehicle subsystems 120 may include the regenerative braking system 122. The regenerative braking system 122 may include various components structured to generate electricity from vehicle braking events to at least one of (i) power the motor 117 and/or various electrical components of the vehicle 100, and (ii) be stored by the energy storage system 119 for future use (e.g., by the motor 117, by the electrical vehicle components, etc.). The vehicle subsystems 120 may include other components including mechanically driven or electrically driven vehicle components (e.g., HVAC system, lights, pumps, fans, etc.). The vehicle subsystems 120 may also include any component used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

The operator I/O device 130 may enable an operator of the vehicle 100 (or passenger) to communicate with the vehicle 100 and the controller 150. By way of example, the operator I/O device 130 may include, but is not limited to, an interactive display, a touchscreen device, one or more buttons and switches, voice command receivers, and the like. In one embodiment, the operator I/O device 130 includes a brake and an accelerator pedal. The sensors 140 may include sensors positioned and/or structured to monitor operating characteristics of various components of the vehicle 100. By way of example, the sensors 140 may include a charge sensor structured to facilitate monitoring the energy level of the energy storage system 119 and/or the flow of electricity into and/or out of the energy storage system 119 (e.g., current, voltage, power, etc.).

As the components of FIG. 1 are shown to be embodied in the vehicle 100, the controller 150 may be structured as an electronic control module (ECM). The ECM may include a transmission control unit and any other vehicle control unit (e.g., exhaust aftertreatment control unit, powertrain control module, engine control module, etc.). The function and structure of the controller 150 is described in greater detail in FIG. 3.

Figure 2:
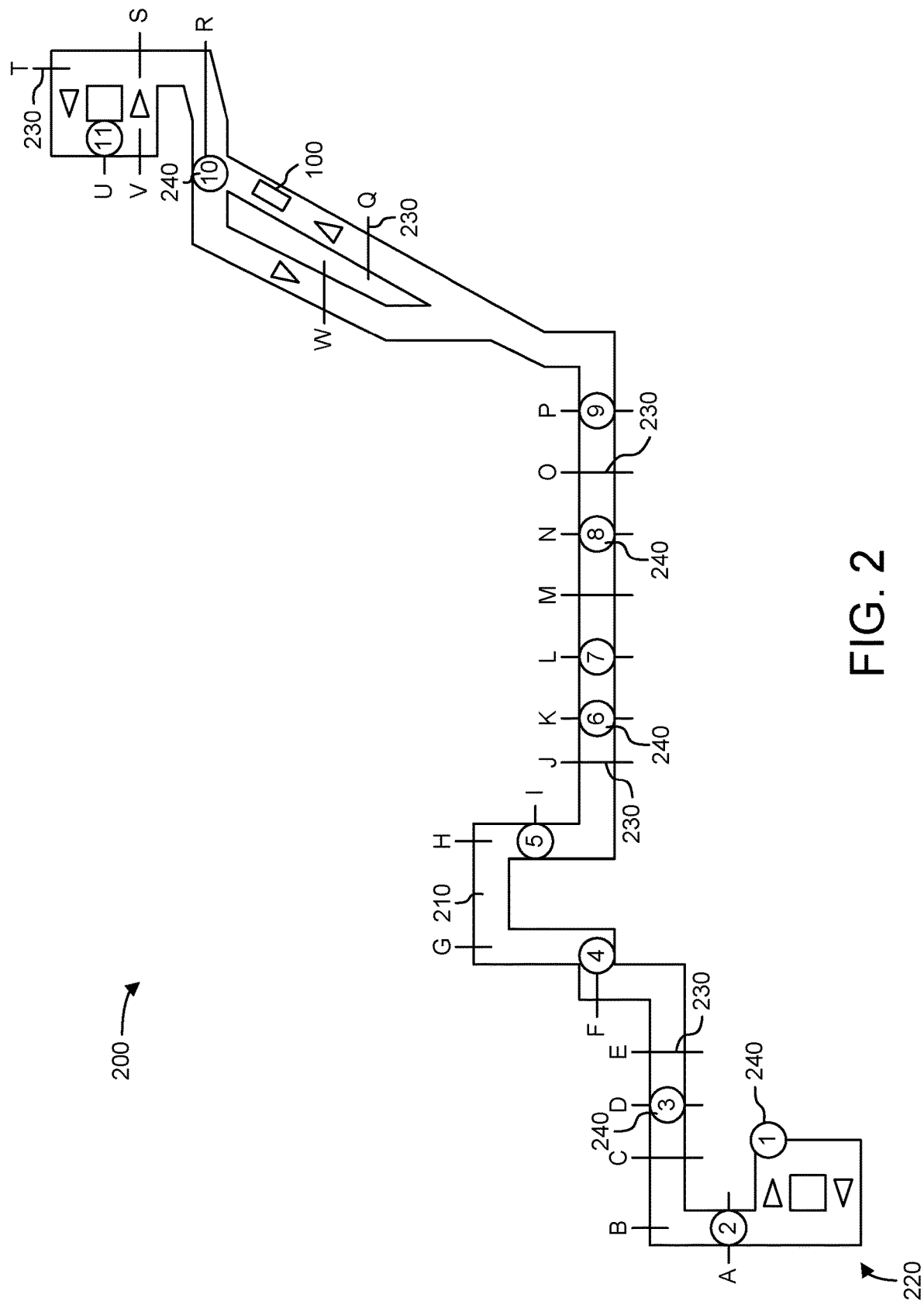
FIG. 2 is a schematic diagram of a route of the vehicle of FIG. 1, according to an example embodiment.

Referring now to FIG. 2, the vehicle 100 is structured as a vehicle that travels along a route 200. As shown in FIG. 2, the route 200 includes a predefined path 210 along which the vehicle 100 may travel, in some cases on a recurring basis or at least a portion of on a recurring basis (e.g., every day, every other day, every Monday, etc.). The predefined path 210 of the route 200 may include a vehicle depot 220 (e.g., a vehicle maintenance center, a vehicle hub, etc.), a plurality of preselected stops 230 (e.g., bus stops, delivery locations, trash pick-up locations, stops A-W, etc.) positioned along the route 200, and/or a plurality of charging stations 240 positioned at one or more of the plurality of preselected stops 230 (e.g., charging stations 1-11, etc.). By way of example, the vehicle 100 may be a refuse vehicle (e.g., a garbage truck, a recycling truck, etc.), a public transportation vehicle (e.g., a bus, a trolley, a tram, etc.), a delivery vehicle, a service vehicle (e.g., a cable truck, a maintenance vehicle, etc.), and/or any other type of vehicle that may travel along a predefined route and/or make frequent stops. According to some embodiments, the energy storage system 119 of the vehicle 100 is structured to receive electrical energy from the plurality of charging stations 240 while the vehicle 100 is stopped at a respective one of the plurality of preselected stops 230 having a charging station 240 (e.g., while a bus is picking up and/or dropping off passengers, while an operator of a delivery truck is making a delivery on foot, while a refuse vehicle is picking up trash at a stop, while an operator of a service vehicle is performing a service, while the vehicle 100 is at the vehicle depot 220, etc.). Such charging of the energy storage system 119 may facilitate maintaining the charge level thereof above a threshold charge level such that the vehicle 100 may operate with the engine 111 in the off-mode, less than would otherwise be needed if the energy storage system 119 was not charged, and/or at a reduced power output for an increased duration of time (e.g., increasing the efficiency of the vehicle 100, etc.).

In some embodiments, the vehicle 100 is structured as a vehicle that travels along a non-predefined path or route (e.g., semi-random, unknown, etc.). In some embodiments, the vehicle 100 may be structured to operate within a predefined area (e.g., a specific metropolitan area, a specific city, a specific county, a specific town; a taxi, a limousine, a ride-sharing vehicle, a law enforcement vehicle, a firefighting vehicle; etc.). Such a vehicle may include components (e.g., a global positioning system (GPS), an intelligent transportation system (ITS), etc.) structured to determine when the vehicle 100 is within a proximity of one or more of the plurality of charging stations 240. In some embodiments, the vehicle 100 includes one or more components (e.g., near field communication devices, etc.) structured to facilitate wirelessly detecting one or more of the plurality of charging stations 240 as the vehicle 100 is driving.

Figure 3:
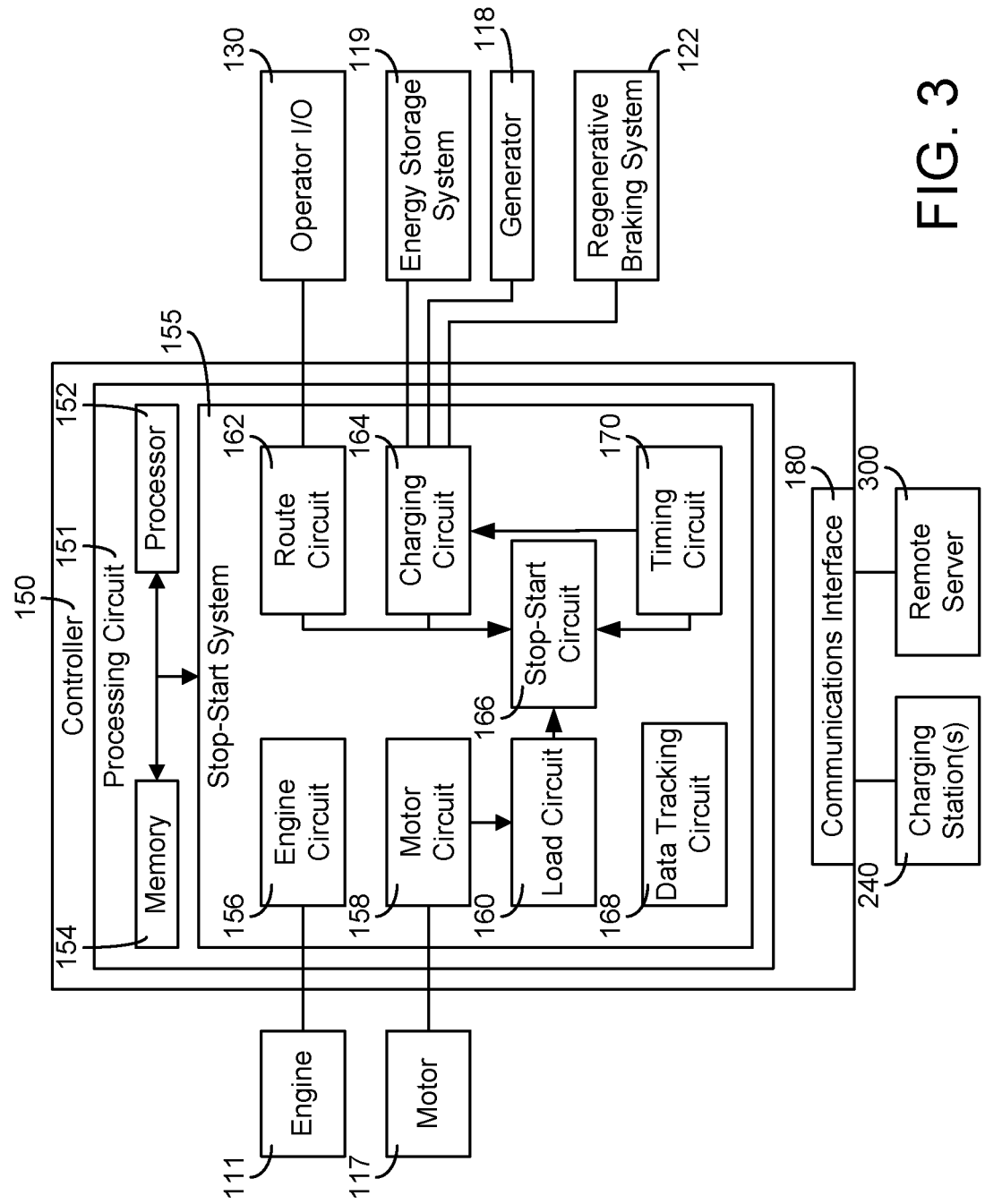
FIG. 3 is a schematic diagram of the controller of the vehicle of FIG. 1, according to an example embodiment.

Referring now to FIG. 3, a schematic diagram of the controller 150 of the vehicle 100 of FIG. 1 is shown according to an example embodiment. As shown in FIG. 3, the controller 150 includes a processing circuit 151 and a communications interface 180. The processing circuit 151 includes a processor 152, a memory 154, and a stop-start system 155. The processor 152 may be implemented as a general-purpose processor, an application specific integrated circuit (ASIC), one or more field programmable gate arrays (FPGAs), a digital signal processor (DSP), a group of processing components, or other suitable electronic processing components. The memory 154 (e.g., RAM, ROM, Flash Memory, hard disk storage, etc.) may store data and/or computer code for facilitating the various processes described herein. The memory 154 may be communicably connected to the processor 152 and the stop-start system 155 and structured to provide computer code or instructions to the processor 152 for executing the processes described in regard to the stop-start system 155 herein. Moreover, the memory 154 may be or include tangible, non-transient volatile memory or non-volatile memory. Accordingly, the memory 154 may include database components, object code components, script components, or any other type of information structure for supporting the various activities and information structures described herein.

The stop-start system 155 includes various circuits for completing the activities described herein. More particularly, the stop-start system 155 includes an engine circuit 156, a motor circuit 158, a load circuit 160, a route circuit 162, a charging circuit 164, a stop-start circuit 166, a data tracking circuit 168, and a timing circuit 170. The circuits 156-168 are structured to (i) determine a stop-start strategy for the vehicle 100 based on the one or more charging opportunities and (ii) control the electromechanical device 116 (e.g., the motor 117, the generator 118, etc.), the energy storage system 119, and/or the engine 111 according to the stop-start strategy. While various circuits with particular functionality are shown in FIG. 3, it should be understood that the controller 150, the stop-start system 155, and/or the memory 154 may include any number of circuits for completing the functions described herein. For example, the activities and functionalities of circuits 156-170 may be embodied in the memory 154, or combined in multiple circuits or as a single circuit. Additional circuits with additional functionality may also be included. Further, it should be understood that the controller 150 may further control other activity beyond the scope of the present disclosure.

Certain operations of the controller 150 described herein may include operations to interpret and/or to determine one or more parameters. Interpreting or determining, as utilized herein, includes receiving values by any method known in the art, including at least receiving values from a datalink or network communication, receiving an electronic signal (e.g., a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The communications interface 180 may include wired or wireless interfaces (e.g., jacks, antennas, transmitters, receivers, transceivers, wire terminals, etc.) for conducting data communications with various systems, devices, or networks. For example, the communications interface 180 may include an Ethernet card and port for sending and receiving data via an Ethernet-based communications network and/or a Wi-Fi transceiver for communicating via a wireless communications network. The communications interface 180 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 180 of the controller 150 may facilitate communication between and among the controller 150, the stop-start system 155, and components of the vehicle 100 (e.g., the powertrain system 110, the engine 111, the motor 117, the generator 118, the energy storage system 119, the operator I/O device 130, the sensors 140, etc.). The communications interface 180 of the controller 150 may additionally or alternatively facilitate communication between and among the stop-start system 155 and the controller 150, one or more of the plurality of charging stations 240, and/or a remote server 300. The remote server 300 may include a GPS and/or an ITS. Communication between and among the controller 150, the stop-start system 155, the components of the vehicle 100 (e.g., the powertrain system 110, the engine 111, the motor 117, the generator 118, the energy storage system 119, the operator I/O device 130, the sensors 140, etc.), the plurality of charging stations 240, and/or the remote server 300 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The engine circuit 156 may be structured to control operation of and/or receive data regarding the operation of the engine 111. By way of example, the engine circuit 156 may be structured to facilitate selectively coupling the engine 111 to the generator 118 (e.g., to charge the energy storage system 119, to power the motor 117, etc.) and/or the transmission 112 (e.g., to at least partially drive the vehicle 100, etc.). In some embodiments, the engine circuit 156 may include or be communicably and operatively coupled to the engine 111 to facilitate controlling operation of the engine 111.

The motor circuit 158 may be structured to control operation of and/or receive data regarding the operation of the motor 117. By way of example, the motor circuit 158 may be structured to facilitate selectively coupling the motor 117 to the generator 118, the energy storage system 119 (e.g., to power the motor 117, etc.), and/or the transmission 112 (e.g., to at least partially drive the vehicle 100, etc.). By way of another example, the motor circuit 158 may be structured to receive data from the motor 117 (e.g., sensors 140 of the motor 117, etc.) indicating a current load on the motor 117, a power draw of the motor 117 (e.g., from the energy storage system 119 and/or the generator 118, etc.), etc. In some embodiments, the motor circuit 158 may include or be communicably and operatively coupled to the motor 117 to facilitate controlling operation of the motor 117.

According to one embodiment, the motor circuit 158 may include communication circuitry structured to facilitate the exchange of information, data, values, non-transient signals, etc. between and among the motor circuit 158, the load circuit 160, the motor 117, and/or the sensors 140. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the motor circuit 158 may include communication circuitry including, but not limited to, wired and wireless communication protocol to facilitate reception of the data regarding operation of the motor 117.

In another embodiment, the motor circuit 158 may include machine-readable media stored by the memory 154 and executable by the processor 152, wherein the machine-readable media facilitates performance of certain operations to receive the data regarding the operation of the motor 117. For example, the machine-readable media may provide an instruction (e.g., command, etc.) to the sensors 140 of the motor 117 to acquire the motor data. In this regard, the machine-readable media may include programmable logic that defines the frequency of acquisition of the motor data. In yet another embodiment, the motor circuit 158 may include any combination of machine-readable content, communication circuitry, the motor 117, and the sensors 140.

The load circuit 160 may be structured to receive and interpret data from the motor circuit 158 to determine a load on the motor 117 of the electromechanical device 116. The load circuit 160 may be further structured to compare the determined load to a load threshold and provide a signal to the stop-start circuit 166 and/or the engine circuit 156 in response to the load on the motor 117 exceeding the load threshold. According to one embodiment, the load circuit 160 may include communication circuitry structured to facilitate the exchange of information, data, values, non-transient signals, etc. between and among the load circuit 160, the engine circuit 156, the motor circuit 158, and/or the stop-start circuit 166. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the load circuit 160 may include communication circuitry including, but not limited to, wired and wireless communication protocol to facilitate reception of the data from the motor circuit 158.

In another embodiment, the load circuit 160 may include machine-readable media stored by the memory 154 and executable by the processor 152, wherein the machine-readable media facilitates performance of certain operations to receive the data regarding the operation. For example, the machine-readable media may provide an instruction (e.g., command, etc.) to the motor circuit 158 to acquire the motor data from the sensors 140 of the motor 117. In this regard, the machine-readable media may include programmable logic that defines the frequency of acquisition of the motor data. In yet another embodiment, the load circuit 160 may include any combination of machine-readable content and communication circuitry.

The route circuit 162 may be structured to determine, identify, and/or estimate a number of charging locations and/or opportunities for the energy storage system 119 of the vehicle 100 based on one or more charging stations 240 positioned along the route 200 of the vehicle 100. In one embodiment, the route 200 is a fixed path (e.g., the predefined path 210, etc.) entered by a user via the operator I/O device 130 such that the locations of the charging stations 240 that the vehicle 100 should encounter while in transit are known ahead of time (e.g., preprogrammed, etc.). In another embodiment, the route 200 is a variable path. The route circuit 162 may thereby be additionally or alternatively structured to wirelessly detect one or more charging stations 240 as the vehicle 100 is in transit (e.g., using GPS, ITS, near field communication protocols, radio, cellular, etc.).

According to one embodiment, the route circuit 162 may include communication circuitry structured to facilitate the exchange of information, data, values, non-transient signals, etc. between and among the route circuit 162, the operator I/O device 130, the charging stations 240, and/or the stop-start circuit 166. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the route circuit 162 may include communication circuitry including, but not limited to, wired and wireless communication protocol to facilitate reception of information from the operator I/O device 130 and/or the charging stations 240.

In another embodiment, the route circuit 162 may include machine-readable media stored by the memory 154 and executable by the processor 152, wherein the machine-readable media facilitates performance of certain operations to receive the information regarding the charging locations and/or opportunities. For example, the machine-readable media may provide an instruction (e.g., command, etc.) to the communications interface 180 to acquire signals from the charging stations 240 to determine charging locations and/or opportunities. In this regard, the machine-readable media may include programmable logic that defines the frequency of acquisition of the information regarding charging locations and/or opportunities. In yet another embodiment, the route circuit 162 may include any combination of machine-readable content, communication circuitry, and the operator I/O device 130.

The charging circuit 164 may be structured to receive and interpret data from sensors 140 of the energy storage system 119 indicative of an energy level of the stored energy within the energy storage system 119. The charging circuit 164 may be further structured to receive and interpret data from sensors 140 of the generator 118 and/or the regenerative braking system 122 indicative of an amount of energy being supplied to the energy storage system 119. The charging circuit 164 may be further structured to receive and interpret data from sensors 140 of the energy storage system 119 indicative of an amount of energy being drawn by the motor 117 from the energy storage system 119. The charging circuit 164 may be further structured to estimate whether the energy level of the energy storage system 119 may decrease below an energy threshold before the vehicle 100 reaches a charging station 240 (e.g., based on the current energy level, the current energy input from the generator 118 and/or the regenerative braking system 122, the current energy output to the motor 117, a distance between the vehicle 100 and the next charging station 240 at which the vehicle 100 may likely stop, etc.).

The charging circuit 164 may be structured to monitor the state of charge (SOC) of the energy storage system 119 and compare the SOC to a SOC depletion trajectory for the energy storage system 119. In some embodiments, the SOC depletion trajectory is a linear time-based relationship. By way of example, a transit bus may operate daily for a sixteen hour shift. Therefore after eight hours, no more than half of the capacity of the energy storage system 119 should be consumed, and after twelve hours, no more than three-quarters of the capacity of the energy storage system 119 should be consumed. In some embodiments, the SOC depletion trajectory is additionally or alternatively based on (i) the current vehicle operating conditions, (ii) the number of determined, estimated, and/or identified charging locations and/or opportunities, and/or (iii) expected charges to be received by the energy storage system 119 from the charging locations and/or opportunities. Such trajectories may be implemented to produce a fully or substantially depleted energy storage system 119 at or near the end of the driving shift, thereby effectively limiting the amount of use of the engine 111.

According to one embodiment, the charging circuit 164 may include communication circuitry structured to facilitate the exchange of information, data, values, non-transient signals, etc. between and among the charging circuit 164, energy storage system 119, the charging stations 240, the generator 118, the motor 117, the regenerative braking system 122, the sensors 140, and/or the stop-start circuit 166. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the charging circuit 164 may include communication circuitry including, but not limited to, wired and wireless communication protocol to facilitate reception of information from the energy storage system 119, the charging stations 240, the generator 118, the motor 117, the regenerative braking system 122, and/or the sensors 140.

In another embodiment, the charging circuit 164 may include machine-readable media stored by the memory 154 and executable by the processor 152, wherein the machine-readable media facilitates performance of certain operations to receive the data regarding the energy storage system 119. For example, the machine-readable media may provide an instruction (e.g., command, etc.) to the sensors 140 to acquire data indicative of the charge level of the energy storage system 119, an energy output of the energy storage system 119, an energy input into the energy storage system 119, and/or charging opportunities for the energy storage system 119. In this regard, the machine-readable media may include programmable logic that defines the frequency of acquisition of the information regarding charge level, the energy input, the energy output, and/or the charging opportunities. In yet another embodiment, the charging circuit 164 may include any combination of machine-readable content, communication circuitry, the energy storage system 119, the generator 118, and the regenerative braking system 122.

The stop-start circuit 166 may be structured to determine a stop-start strategy for the vehicle 100 based on (i) the number of determined, estimated, and/or identified charging locations and/or opportunities and/or (ii) expected charges to be received by the energy storage system 119 from the charging locations and/or opportunities (e.g., determined by the route circuit 162, etc.). The stop-start strategy may define a frequency and/or a duration of using the engine 111 in the on-mode during operation of the vehicle 100 along the planned route. According to an example embodiment, the stop-start strategy controls when the engine 111 of the vehicle 100 operates in the on-mode or the off-mode. The stop-start circuit 166 may be further structured to control the electromechanical device 116 (e.g., the motor 117, the generator 118, etc.), the energy storage system 119, and/or the engine 111 according to the stop-start strategy. By way of example, the stop-start circuit 166 may be structured to determine the stop-start strategy prior to the vehicle 100 traveling a route (e.g., the route 200, etc.). For example, the route may be preprogrammed or predetermined ahead of time (e.g., by the route circuit 162, the predefined path 210, etc.) such that the stop-start circuit 166 has knowledge of the quantity and frequency of charging stations 240 (e.g., distance between charging stations, etc.) expected to be encountered by the vehicle 100 during transit. The stop-start circuit 166 may thereby determine the stop-start strategy based on such knowledge. The stop-start circuit 166 may be structured to update the stop-start strategy in response to a charging station 240 being missed along the route of the vehicle 100 (e.g., to compensate for missed charging opportunities that were originally planned to be encountered, the energy storage system 119 failing to receive an expected charge at one of the charging stations 240, etc.). The vehicle 100 may miss a charging station 240 due to the charging station 240 being out-of-order, already occupied by another vehicle, road closures (e.g., detours, etc.), etc. The stop-start circuit 166 may be further structured to control the electromechanical device 116, the energy storage system 119, and/or the engine 111 according to the updated stop-start strategy. The stop-start circuit 166 may compensate for the energy storage system 119 failing to receive the expected charge by increasing use of the engine 111 in the on-mode during operation of the vehicle 100 along the planned route. Increasing the use of the engine 111 may include at least one of increasing the frequency and the duration of using the engine 111 in the on-mode.

By way of another example, the stop-start circuit 166 may be structured to determine the stop-start strategy while the vehicle 100 is traveling a route (e.g., a random or semi-random route, etc.). For example, the stop-start circuit 166 may receive information (e.g., from the route circuit 162, etc.) regarding one or more charging stations 240 detected as the vehicle 100 is in transit. The stop-start circuit 166 may thereby determine the stop-start strategy based on such information. The stop-start circuit 166 may be structured to update the stop-start strategy in response to a detected charging station 240 being missed along the route of the vehicle 100. The vehicle 100 may miss a charging station 240 due to the charging station 240 being out-of-order, already occupied by another vehicle, road closures (e.g., detours, etc.), etc. The stop-start circuit 166 may be further structured to control the electromechanical device 116, the energy storage system 119, and/or the engine 111 according to the updated stop-start strategy.

In some embodiments, the stop-start circuit 166 is further structured to provide a command to the engine circuit 156 to operate the engine 111 in the on-mode in response to the charging circuit 164 determining that the energy level of the energy storage system 119 may decrease below the energy threshold (e.g., the SOC depletion trajectory, etc.). The stop-start circuit 166 may provide such a command to maintain the energy level of the energy storage system 119 above the energy threshold (e.g., the SOC depletion trajectory, etc.) by at least one of (i) charging the energy storage system 119 with the engine 111 via the generator 118, (ii) powering the motor 117 directly with the engine 111 via the generator 118, (iii) driving the vehicle 100 with the engine 111 and not the motor 117, and (iv) driving the vehicle 100 with a combination of the motor 117 and the engine 111. By way of example, the stop-start circuit 166 may be structured to maintain the engine 111 in an off-mode as long as the SOC of the energy storage system 119 is at or above the SOC depletion trajectory. In the event that the SOC of the energy storage system 119 drops below or approaches the SOC depletion trajectory, the stop-start circuit 166 may be structured to start the engine 111 to correct for the deviation and bring the SOC of the energy storage system 119 back above or further above the SOC depletion trajectory. The stop-start circuit 166 may thereby minimize engine operation over the drive cycle of the vehicle 100 to produce a fully or substantially depleted energy storage system 119 at or near the end of the driving shift.

In some embodiments, the stop-start circuit 166 is further structured to send a command to the operator I/O device 130 to provide a notification to the operator of the vehicle 100 to remain at a current or future charging station 240 for an extended period of time (e.g., to replenish the energy level of the energy storage system 119, etc.).

In some embodiments, the stop-start circuit 166 is further structured to provide a command to the engine circuit 156 to operate the engine 111 in the on-mode in response to the load on the motor 117 exceeding a load threshold (e.g., determined by the load circuit 160, when the vehicle 100 encounters a steep incline, etc.). The stop-start circuit 166 may provide such a command such that the engine 111 at least one of (i) at least partially drives the vehicle 100 to at least partially reduce the load on the motor 117 and (ii) cooperatively powers the motor 117 via the generator 118 along with the energy storage system 119 to increase the electrical power provided thereto.

According to one embodiment, the stop-start circuit 166 may include communication circuitry structured to facilitate the exchange of information, data, values, non-transient signals, etc. between and among the stop-start circuit 166, the charging circuit 164, the route circuit 162, the load circuit 160, the motor circuit 158, and/or the engine circuit 156. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the stop-start circuit 166 may include communication circuitry including, but not limited to, wired and wireless communication protocol to facilitate reception of and/or provide information from/to the charging circuit 164, the route circuit 162, the load circuit 160, the motor circuit 158, and/or the engine circuit 156.

In another embodiment, the stop-start circuit 166 may include machine-readable media stored by the memory 154 and executable by the processor 152, wherein the machine-readable media facilitates performance of certain operations to receive the data regarding the operation. For example, the machine-readable media may provide an instruction (e.g., command, etc.) to the engine circuit 156 to turn on or turn off the engine 111 and/or to the operator I/O device 130 to provide a notification to the operator. In yet another embodiment, the stop-start circuit 166 may include any combination of machine-readable content and communication circuitry.

As a practical example, referring back to FIG. 2, the vehicle 100 may be a public transit bus that travels along the predefined path 210, making various stops at the preselected stops 230 along the predefined path 210. The preselected stops 230 may or may not include a charging station 240. The controller 150 may be structured to determine a stop-start strategy for the vehicle 100 based on the number of, the frequency of, and/or the distance between charging stations 240 and/or characteristics of the entire transit of the vehicle 100 (e.g., length of travel, loading conditions such as hills, speed limits, etc.). When the vehicle 100 stops at a preselected stop 230 having a charging station 240, the energy storage system 119 is structured to charge for the duration of the time the vehicle 100 is at the preselected stop 230, thereby increasing the charge level of the energy storage system 119. Such an increase in the charge level of the energy storage system 119 may be expected by the controller 150 (e.g., since the route is predefined, etc.), such that the stop-start strategy in place remains the same.

However, if the vehicle 100 does not stop at a preselected stop 230 or does not receive a charge from the charging station 240 at a preselected stop 230 (e.g., the vehicle operator may bypass a stop if there are no passengers to pick up or drop off at the stop, the charging station 240 is out-of-order, a detour takes the vehicle 100 around a preselected stop 230, etc.), the controller 150 may be structured to update the stop-start strategy to compensate for the lost charging opportunity that was originally planned for when the stop-start strategy was generated. Such an update may cause the controller 150 to operate the engine 111 to at least one of (i) at least partially drive the vehicle 100 to reduce the load on the motor 117 to reduce the amount of energy drawn from the energy storage system 119, (ii) drive the generator 118 to charge the energy storage system 119 to compensate for the missed charging opportunity, and (iii) drive the generator 118 to directly power the motor 117 to reduce the amount of energy drawn from the energy storage system 119.

Referring back to FIG. 3, the data tracking circuit 168 may be structured to aggregate information regarding the route of the vehicle 100, the number charging opportunities, the number of charging opportunities taken advantage of, and/or the number of charging opportunities missed. In some embodiments, the information aggregated by the data tracking circuit 168 is downloaded to a central computer (e.g., the remote server 300, etc.) for further analysis. In some embodiments, the data tracking circuit 168 is structured to perform such analysis. By way of example, the analysis may facilitate making determinations (i) that additional charging stations 240 are needed along a route or within a respective area and/or (ii) that the tendencies of the operator of the vehicle 100 needs to be addressed such that he or she actively attempts to stop at the charging stations 240.

In hybrid and electric vehicle applications, energy usage decisions may be made more optimal by programming into the system an indication of a driving route to be followed. For example, in some systems a destination and/or a driving route may be preprogrammed or preset. Such preprogramming may be joined with a GPS for trip planning and/or for routing and planning stops for battery recharging. As another example, in some systems an operator may enter a total trip distance to be traveled so that battery usage can be planned. However, this could require a considerable amount of data and/or external devices, or it may require the operator to input data that may not be readily available (such as destination or travel distance) in order to achieve the energy usage optimization. These examples use a distance-based approach to control energy usage decisions. By way of example, if a vehicle is travelling from New York to San Francisco, an operator may plan a route and know the distances between points where battery chargers are located. However, in a commercial vehicle implementation, and in particular for transit buses, distance is not a critical parameter, but rather time is a critical parameter. For example, a public transportation bus operates on a fixed timetable established by a local transit authority, and has fixed and unchanging hours of operation. Operators of such public transportation buses have a strong incentive to adhere to the predefined timetable (e.g., to keep the bus riders happy, etc.). The knowledge of the predefined timetable may facilitate precise energy usage and charging planning decisions for an electric and/or a hybrid vehicle.

The timing circuit 170 may be structured to facilitate making stop-start decisions based on a predefined timetable. By way of example, the timing circuit 170 may be structured to store a predefined timetable and monitor where the vehicle 100 is along the timetable. Further, the timing circuit 170 may be structured to utilize a clock to monitor the time between stops, the elapsed time the vehicle 100 is at a respective stop, and/or an amount of time the vehicle 100 has been charging. By maintaining a detailed timetable and tracking progress along such timetable, the timing circuit 170 may be structured to determine when and/or for how long access to a battery charger will be available for the vehicle 100 to recharge (e.g., how soon the expected departure time is, how soon the expected arrival time is, etc.).

The stop-start circuit 166 may be structured to additionally or alternatively determine the stop-start strategy based on a vehicle's progress along and/or compliance with the timetable. By way of example, if the vehicle 100 is running behind schedule, less time may be available to charge at stops. The stop-start circuit 166 may therefore be structured to operate the engine 111 in the on-mode of operation more frequently and/or for extended periods of time. By way of another example, if the vehicle 100 is running ahead of schedule, more time may be available to charge at stops. The stop-start circuit 166 may therefore be structured to operate the engine 111 in the off-mode of operation more frequently and/or for extended periods of time.

The charging circuit 164 may be structured to estimate whether the energy level of the energy storage system 119 may decrease below an energy threshold based on knowledge of the timetable and/or compare the SOC to the SOC depletion trajectory determined at least in part based on such knowledge of the timetable.

The charging circuit 164 may be further structured to make charging decisions (e.g., how much charge to take on at a charging station, etc.) based on the current compliance with the predefined timetable (e.g., ahead of schedule, behind schedule, etc.) and/or the progress along the timetable (e.g., at the beginning of the day/route, nearing the end of the day/route, etc.). By way of example, as the vehicle 100 approaches the end of its drive cycle at the end of the day, it may be less important to take on additional charge at a charging station. For example, a quick boost charge usually occurs at higher currents than a slower, overnight charge and, consequently, has a greater impact on battery life. Therefore, at the end of a drive cycle, it may be undesirable to quickly recharge a battery at a charging station when the vehicle 100 is at the end of its shift and headed back to the depot for a slow, overnight charge, particularly if the quick charge results in the vehicle 100 returning to the depot at the end of the day with battery charge left over. Such knowledge of the progress along the timetable is used by the charging circuit 164 in making such determinations (e.g., to limit unnecessary charging at the end of a drive cycle, etc.). As an example, if a bus is only 20 minutes from completing its drive cycle, the charging circuit 164 may be structured to shorten a charging event and/or limit an amount of current provided by a charging station such that the energy storage device 119 only takes on as much charge as necessary for the remainder of the drive cycle (which could even be zero).

By way of another example, the charging circuit 164 may be structured to alter the rate at which the vehicle 100 is charged at a charging station based on compliance with the timetable. For example, if the vehicle 100 is ahead of schedule such that the vehicle 100 can stay longer at a charging station before the next scheduled departure, the charging circuit 164 may be structured to charge the energy storage system 119 at a slower rate (e.g., at a lower current, etc.) to minimize the impact on battery life. While, conversely, if the vehicle 100 is behind schedule such that the vehicle 100 has a brief amount of time at a charging station before the next scheduled departure, the charging circuit 164 may be structured to charge the energy storage system 119 at a higher rate (e.g., at a higher current, etc.) to maintain the battery level above a threshold (e.g., to correspond with the SOC trajectory, etc.).

Figure 4:
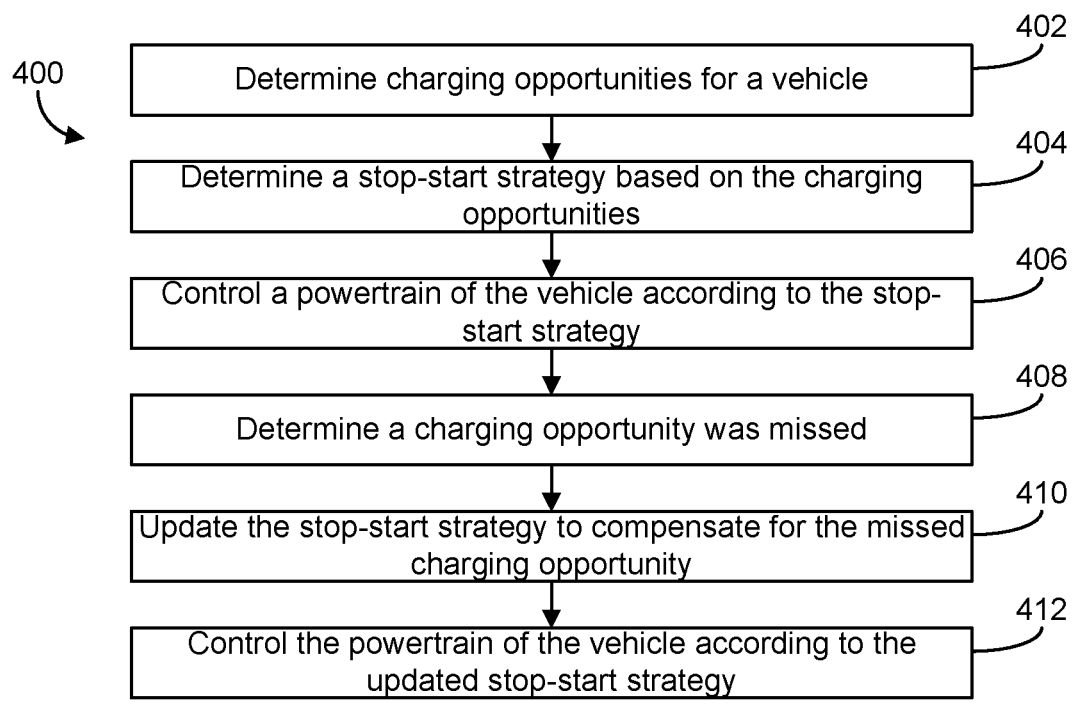
FIG. 4 is a flow diagram of a method for managing engine stop-start, according to an example embodiment.

Referring now to FIG. 4, a method 400 for managing engine stop-start is shown according to an example embodiment. In one example embodiment, method 400 may be implemented with the vehicle 100 and the controller 150 of FIGS. 1-3. As such, method 400 may be described with regard to FIGS. 1-3.

At step 402, the controller 150 is structured to determine (e.g., identify, estimate, etc.) a number of charging locations and/or opportunities for an energy storage system (e.g., the energy storage system 119, etc.) of a vehicle (e.g., the vehicle 100, etc.). In some embodiments, the charging locations and/or opportunities are based on one or more charging stations (e.g., the plurality of charging stations 240, etc.) positioned along a planned route of travel (e.g., the route 200, the predefined path 210, etc.) of the vehicle. The one or more charging stations may be structured to charge the energy storage system of the vehicle (e.g., while the vehicle 100 is stopped at respective locations that include a charging station 240, etc.). The energy storage system may be structured to power an electromechanical device (e.g., the electromechanical device 116, etc.) that at least partially drives the vehicle (e.g., in combination with the engine 111, individually, etc.).

In some embodiments, the controller 150 is structured to determine the charging locations and/or opportunities based on a known location of the one or more charging stations along a predefined route of the vehicle and the current location of the vehicle (e.g., using GPS, etc.). In some embodiments, the controller 150 is structured to determine the charging locations and/or opportunities based on a wireless detection of the one or more charging stations as the vehicle is driving.

At step 404, the controller 150 is structured to determine a stop-start strategy based on (i) the number of determined, estimated, and/or identified charging locations and/or opportunities and/or (ii) expected charges to be received by the energy storage system from the charging locations and/or opportunities. The stop-start strategy may define a frequency and/or a duration of using the engine in an on-mode during operation of the vehicle along the planned route. According to an example embodiment, the controller 150 is structured to operate an engine (e.g., the engine 111, etc.) of the vehicle in the on-mode or an off-mode according to the stop-start strategy. The on-mode of the engine may facilitate at least one of (i) charging the energy storage system with power received from the engine via the electromechanical device (e.g., drive the generator 118 to store generated electrical energy in the energy storage system 119, etc.), (ii) directly powering the electromechanical device with the engine (e.g., drive the generator 118 to power the motor 117 with the generated electrical energy, etc.), and (iii) at least partially driving the vehicle (e.g., the transmission 112, etc.) with the engine.

At step 406, the controller 150 is structured to control a powertrain (e.g., the electromechanical device 116, the energy storage system 119, the engine 111, the powertrain system 110, etc.) of the vehicle according to the stop-start strategy. At step 408, the controller is structured to determine that a charging location and/or opportunity was missed (e.g., the vehicle 100 passed a potential charging opportunity at one of the charging stations 240, the energy storage system failed to receive an expected charge at one of the charging locations, etc.). At step 410, the controller 150 is structured to update the stop-start strategy in response to determining that at least one of the one or more charging stations was missed to compensate for the missed charging location and/or opportunity (e.g., to compensate for failing to receive the expected charge, etc.). The controller 150 may compensate for failing to receive the expected charge by increasing use of the engine in the on-mode during operation of the vehicle along the planned route. Increasing the use of the engine may include at least one of increasing the frequency and the duration of using the engine in the on-mode. At step 412, the controller 150 is structured to control the powertrain of the vehicle to operate the vehicle according to the updated stop-start strategy.

By way of example, the controller 150 may determine that missing a charging location and/or opportunity (i.e., a charging station 240) may cause an energy level of the energy storage system to decrease below an energy threshold before another charging location and/or opportunity is encountered if the engine is not switched to the on-mode. Therefore, the controller 150 may be structured to operate the engine in the on-mode to maintain the energy level of the energy storage system above the energy threshold by at least one of (i) charging the energy storage system with power provided by the engine via the electromechanical device, (ii) powering the electromechanical device directly with the engine, (iii) driving the vehicle with the engine and not the electromechanical device, and (iv) driving the vehicle with a combination of the electromechanical device and the engine. In some embodiments, the controller 150 is structured to operate the engine in the on-mode in response to a load on the electromechanical device exceeding a load threshold such that the engine at least one of (i) at least partially drives the vehicle to at least partially reduce the load on the electromechanical device and (ii) cooperatively powers the electromechanical device along with the energy storage system.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 152 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller 150 of FIGS. 1 and 3), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

The invention claimed is:

1. An apparatus, comprising:
a route circuit structured to estimate a number of charging locations for an energy storage system of a vehicle positioned along a planned route of the vehicle, the energy storage system structured to power an electromechanical device for driving the vehicle; and
a stop-start circuit structured to:
determine a stop-start strategy for an engine of the vehicle based on the estimated number of charging locations and expected charges to be received by the energy storage system, the stop-start strategy defining a frequency and a duration of using the engine in an on-mode during operation of the vehicle along the planned route;
determine that the energy storage system fails to receive an expected charge at one of the charging locations; and
update the stop-start strategy to compensate for failing to receive the expected charge by increasing use of the engine in the on-mode during operation of the vehicle along the planned route.

2. The apparatus of claim 1, wherein increasing the use of the engine includes at least one of increasing the frequency and duration of using the engine in the on-mode.

3. The apparatus of claim 1, wherein use of the engine in the on-mode facilitates at least one of (i) charging the energy storage system with power received from the engine, (ii) directly powering the electromechanical device with the engine, and (iii) at least partially driving the vehicle with the engine.

4. The apparatus of claim 1, further comprising a load circuit structured to monitor a load on a motor of the electromechanical device, wherein the stop-start circuit is further structured to use the engine in the on-mode in response to the load exceeding a load threshold such that the engine at least partially drives the vehicle to at least partially reduce the load on the motor of the electromechanical device.

5. The apparatus of claim 1, further comprising a charging circuit structured to monitor an energy level of the energy storage system and to determine that the energy level will decrease below an energy threshold due to failing to receive the expected charge.

6. The apparatus of claim 5, wherein the stop-start circuit is further structured to maintain the energy level of the energy storage system above the energy threshold by at least one of (i) charging the energy storage system with the engine via a generator of the electromechanical device, (ii) powering the electromechanical device directly with the engine via the generator, (iii) driving the vehicle with the engine and not the electromechanical device, and (iv) driving the vehicle with a combination of the electromechanical device and the engine.

7. A method, comprising:
  estimating, by a processing circuit, a number of charging locations for an energy storage system of a vehicle positioned along a planned route of the vehicle, wherein the energy storage system is structured to power an electromechanical device for driving the vehicle;
  determining, by the processing circuit, a stop-start strategy for an engine of the vehicle based on the estimated number of charging locations and expected charges to be received by the energy storage system, the stop-start strategy defining a frequency and a duration of using the engine in an on-mode during operation of the vehicle along the planned route, wherein when in the on-mode the engine at least one of (i) charges the energy storage system, (ii) directly powers the electromechanical device, and (iii) at least partially drives the vehicle;
  determining, by the processing circuit, that the energy storage system fails to receive an expected charge at one of the charging locations; and
  updating, by the processing circuit, the stop-start strategy in response to determining that the expected charge was not received by increasing use of the engine in the on-mode during operation of the vehicle along the planned route.

8. The method of claim 7, wherein estimating the number of charging locations is based on a known location of at least one charging location along the planned route of the vehicle.

9. The method of claim 7, wherein estimating the number of charging locations is based on wireless detection of at least one charging location as the vehicle is driving along the planned route.

10. The method of claim 7, wherein updating the stop-start strategy includes:
  determining, by the processing circuit, that an energy level of the energy storage system will decrease below an energy threshold due to failing to receive the expected charge; and
  maintaining, by the processing circuit, the energy level of the energy storage system above the energy threshold by at least one of (i) charging the energy storage system with the engine via the electromechanical device, (ii) powering the electromechanical device directly with the engine, (iii) driving the vehicle with the engine and not the electromechanical device, and (iv) driving the vehicle with a combination of the electromechanical device and the engine.

11. The method of claim 7, further comprising using, by the processing circuit, the engine in the on-mode in response to a load on the electromechanical device exceeding a load threshold such that the engine at least partially drives the vehicle to at least partially reduce the load on the electromechanical device.

12. A system, comprising:
  a controller communicably and operatively coupled to an engine and an energy storage system of a vehicle, the controller structured to:
    estimate a number of charging locations for the energy storage system along a planned route of the vehicle;
    determine a stop-start strategy for the engine based on the estimated number of charging locations and expected charges to be received by the energy storage system, the stop-start strategy defining a frequency and a duration of using the engine in an on-mode during operation of the vehicle along the planned route;
    determine that the energy storage system fails to receive an expected charge at one of the charging locations; and
    update the stop-start strategy to compensate for failing to receive the expected charge by increasing use of the engine in the on-mode during operation of the vehicle along the planned route.

13. The system of claim 12, wherein increasing the use of the engine includes at least one of increasing the frequency and duration of using the engine in the on-mode.

14. The system of claim 12, wherein the engine is used to at least one of charge the energy storage system and drive the vehicle.

15. The system of claim 12, wherein estimating the number of charging locations is based on wireless detection of at least one charging location as the vehicle is driving along the planned route.

16. The system of claim 12, wherein estimating the number of charging locations is based on a known location of at least one charging location along the planned route of the vehicle.

17. The system of claim 16, wherein the vehicle routinely travels along the planned route, and wherein the vehicle includes at least one of a refuse vehicle, a public transportation vehicle, a delivery vehicle, and a maintenance vehicle.

18. The system of claim 12, wherein the controller is structured to update the stop-start strategy based on determining that an energy level of the energy storage system will decrease below an energy threshold due to failing to receive the expected charge.

19. The system of claim 18, wherein the controller is structured to maintain the energy level of the energy storage system above the energy threshold by at least one of (i) charging the energy storage system with the engine via a generator of an electromechanical device, (ii) powering a motor of the electromechanical device directly with the engine via the generator, (iii) driving the vehicle with the engine and not the motor, and (iv) driving the vehicle with a combination of the motor and the engine.

20. The system of claim 12, wherein the controller is structured to use the engine in the on-mode in response to a load on a motor of an electromechanical device exceeding a load threshold such that the engine at least one of (i) at least partially drives a drivetrain of the vehicle to at least partially reduce the load on the motor of the electromechanical device and (ii) drives a generator of the electromechanical device to directly power the motor and the energy storage system.

* * * * *